(12) United States Patent
Messer et al.

(10) Patent No.: US 9,665,634 B2
(45) Date of Patent: *May 30, 2017

(54) ADVANCED DATABASE SYSTEMS AND METHODS FOR USE IN A MULTI-TENANT SYSTEM

(71) Applicant: Cross Commerce Media, Inc., New York, NY (US)

(72) Inventors: Stephen Messer, New York, NY (US); Kristis Makris, Brooklyn, NY (US); Russell William Martin, Jr., New York, NY (US); Michael Martinov, Cos Cob, CT (US); Heidi Messer, New York, NY (US)

(73) Assignee: CROSS COMMERCE MEDIA, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/790,671

(22) Filed: Jul. 2, 2015

(65) Prior Publication Data
US 2016/0179916 A1    Jun. 23, 2016

Related U.S. Application Data

(63) Continuation of application No. 13/547,202, filed on Jul. 12, 2012, now Pat. No. 9,239,851.

(51) Int. Cl.
*G06F 17/30* (2006.01)

(52) U.S. Cl.
CPC .. *G06F 17/30575* (2013.01); *G06F 17/30283* (2013.01); *G06F 17/30584* (2013.01); *G06F 17/30876* (2013.01)

(58) Field of Classification Search
CPC ................................................ G06F 17/30575
See application file for complete search history.

(56) References Cited

U.S. PATENT DOCUMENTS

| | | |
|---|---|---|
| 8,290,919 B1 | 10/2012 | Kelly et al. |
| 2005/0187977 A1 | 8/2005 | Frost |
| 2008/0189239 A1 | 8/2008 | Bawa et al. |
| 2009/0177988 A1 | 7/2009 | Martins |
| 2010/0030995 A1 | 2/2010 | Wang et al. |

OTHER PUBLICATIONS

International Search Report, dated Jul. 25, 2013, issued in corresponding International Application No. PCT/US2013/046148.
European Supplementary Search Report, dated Feb. 22, 2016, issued in corresponding European Patent Application No. 13817309.1.

*Primary Examiner* — Alexey Shmatov
(74) *Attorney, Agent, or Firm* — Troutman Sanders LLP; James Moore Bollinger; Christopher C. Close, Jr.

(57) ABSTRACT

Large-scale advanced database models, systems, and methods provide a responsive, scalable data storage solution which is ripe for use in data warehousing and analytics environments. These advanced database models, systems, and methods provide for dramatically increased performance in accessing data as well as increased storage capabilities in the data set.

15 Claims, 13 Drawing Sheets

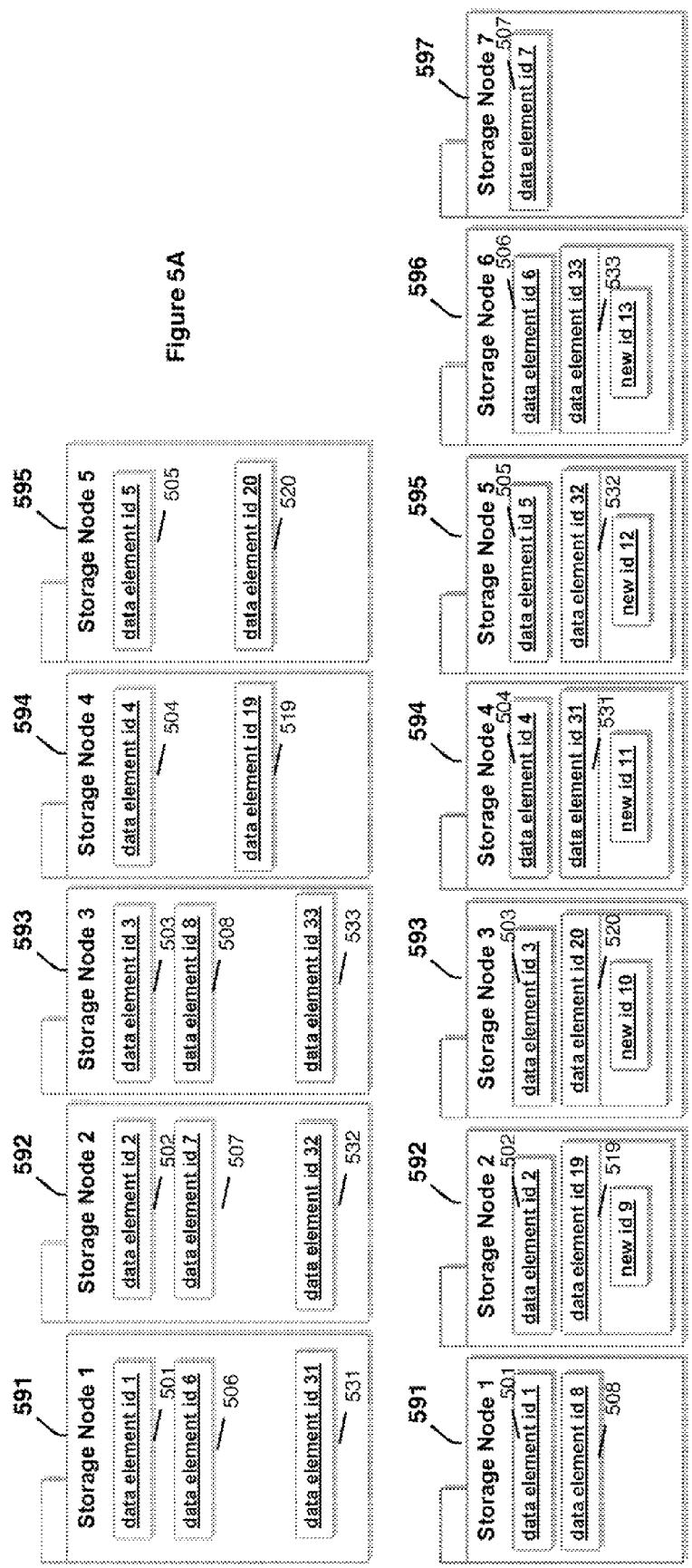

ADVANCED DATABASE SYSTEMS AND METHODS FOR USE IN A MULTI-TENANT SYSTEM

CROSS-REFERENCE TO RELATED APPLICATIONS AND PRIORITY CLAIM

This application is a continuation of and claims priority to U.S. Non-Provisional patent application Ser. No. 13/547,202, filed Jul. 12, 2012, sharing the same title, the entirety of which is incorporated by reference herein.

FIELD OF THE INVENTION

The invention relates to the storage and retrieval of computer-accessible data and, more specifically, to the creation of advanced computer database models, systems, and methods for use in large data-dependent environments.

BACKGROUND OF THE INVENTION

As technology continues to advance, more methods of tracking nearly every aspect of a business are developed. Customers' interactions on websites can be tracked. Users' posts to social networks can be tracked. Detailed sales, logistics, and marketing effectiveness data is collected and analyzed. Data sets will continue to grow in size and complexity because they are increasingly being gathered by ubiquitous information-sensing mobile devices, remote sensing technologies, software logs, cameras, microphones, radio-frequency identification technology, and a plethora of other sensor networks and tracking systems which exist all around us. In sum, about 90% of the data in the history of the world today was created within the past two years. With the advances in the collection of data hitting the market with such force, businesses are facing the ever-daunting challenge of figuring out how to most effectively manage these petabytes of information to achieve their business goals.

Currently, businesses have multiple off-the-shelf options for implementing database systems to store their valuable customer data, however, none of these systems are directed to use in an application service provider (ASP) environment. Some systems, such as those based on the Shared Nothing concept, are created to quickly access data across the database by using independent memory and processors at each node. Such systems may be useful for a small number of individual users and teams, but experience scalability issues in a high-volume multitenant environment. Other forms of databases are designed to compress and store as much information as possible. These platforms are slow and have a high transaction cost due to compressing and linking amongst data elements.

There exists a need for an improved method of storing business intelligence wherein the overall cost of ownership and burden of management is reduced in a high-volume multi-tenant environment. There further exists a need for a storage platform wherein data can be quickly and efficiently stored, as well as accessed at a high rate of speed in order to provide on-the-fly information to multiple data owners.

Other problems and drawbacks also exist.

SUMMARY OF THE INVENTION

Briefly described, embodiments of the present invention provide for a scalable and efficient means of storing and quickly retrieving data elements of a large data store. Systems as described herein may be useful in providing analytics services to multiple data owners and stakeholders with disparate datasets. In some embodiments, a database receives data elements to be stored and determines whether the data elements should be spread amongst various nodes of the database. If the data elements are not spread, the data elements are duplicated and stored in their entirety in multiple nodes.

Embodiments of the invention may relate to a high-performance decision support system enabling multiple users and stakeholders to access and analyze vast amounts of data to determine answers to business scenario questions and to achieve actionable business intelligence in an optimized, rapid, and efficient manner.

Systems according to some of the aspects of the present invention may comprise a cluster of independent nodes. Such systems may differentiate between fact and dimensional tables when assigning data elements to the various nodes in the system. According to embodiments of the invention, data elements may be examined to identify which data elements relate to metric or attribute data. In the case of dimensional tables, or attribute data, the database may compress the data values across multiple cluster nodes. The compressed data may be duplicated amongst the database system to allow local operation of database functions with minimal cross-talk amongst system components. In the case of fact tables, or metric data, they may be distributed amongst the various cluster nodes intelligently. In some embodiments of the invention, these fact tables may be distributed with respect to the owner of the inherent data.

Compressed elements in database systems built according to aspects of the invention may further be optimized by the use of a data evaluation engine. The data evaluation engine may operate during real-time use of the database system such that the engine may monitor queries being made of the database. The data evaluation engine may further predict future queries and allocate or reallocate storage on-the-fly in order to be responsive to the anticipated needs of users of the database system.

These and other objects, features and advantages of the advanced database systems, methods and programs of the invention will be elucidated in the following further description including accompanying drawing figures.

BRIEF DESCRIPTION OF THE FIGURES

The purpose and advantages of the present invention will be apparent to those of skill in the art from the following detailed description in conjunction with the appended drawings in which like reference characters are used to indicate like elements, and in which:

FIGS. 5A and 5B are an example of data redistribution in a sample storage system of five nodes that is extended in capacity to seven nodes according to an embodiment of the present invention.

DETAILED DESCRIPTION OF CERTAIN PREFERRED EMBODIMENTS

Figure 1:
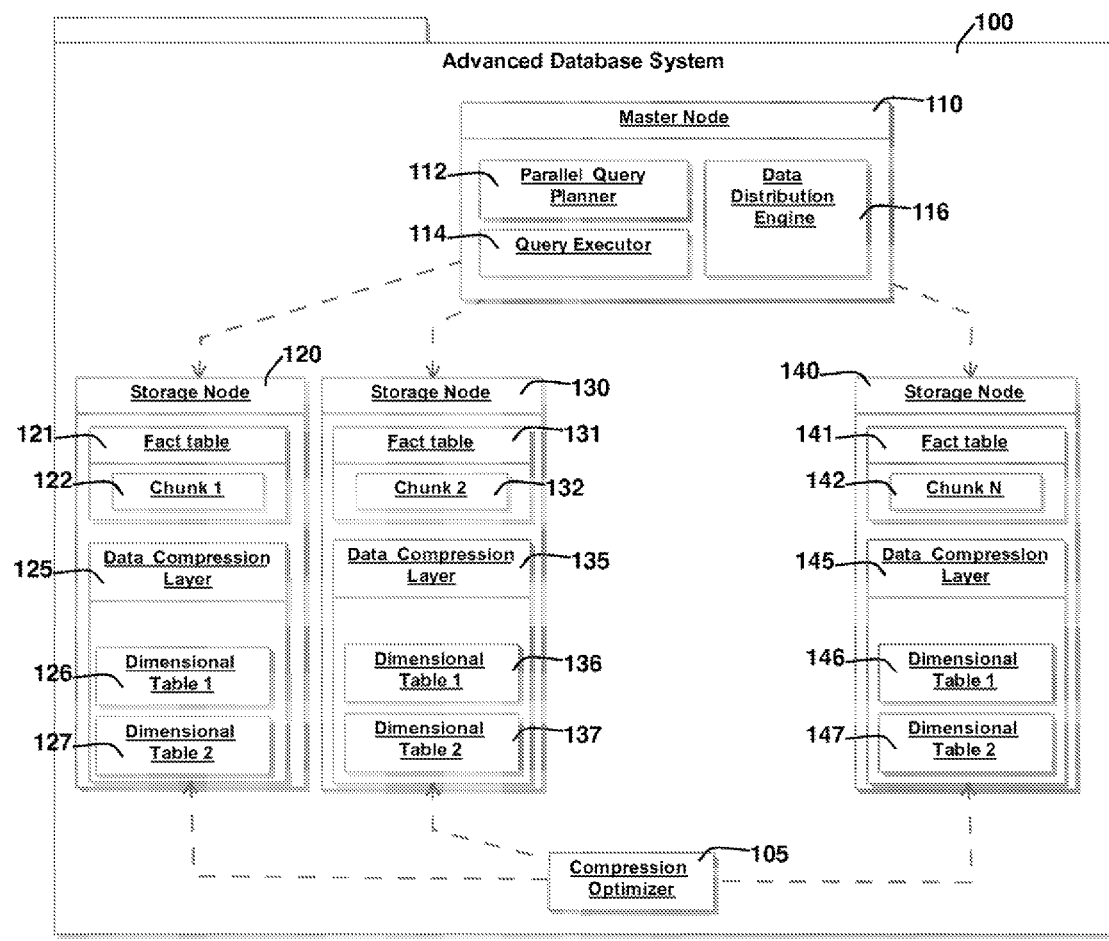
FIG. 1 is a graphic model of an advanced database according to embodiments of the present invention.

To facilitate an understanding of the principles and features of the invention, various illustrative embodiments are explained hereinafter. Although certain examples of the invention are explained in detail, other embodiments are contemplated. Further, in describing the illustrative embodiments, specific terminology will be resorted to for the sake of clarity. It is not intended that the invention is limited in its scope to the details of construction and arrangement of components set forth in the following description or illustrated in the drawings. The invention has other embodiments and can be practiced or carried out in various other ways as will be understood by one of ordinary skill in the art once in possession of the subject matter herein.

The materials and components described as making up the various elements of the invention are intended to be illustrative and not restrictive. Many suitable materials and components that would perform the same or a similar function as the materials and components described herein are intended to be embraced within the scope of the invention. Such other materials and components not described herein can include, but are not limited to, for example, those developed after making of the invention.

Various embodiments of the invention may include instructions executed on computers. The invention may be or include a computer system or multiple computer systems, such as a data warehouse of multiple computer nodes. The invention may be described in the general context of computer-executable instructions, such as program modules, being executed by a computer. Generally, program modules include routines, programs, objects, components, data structures, etc. that perform particular tasks.

Those skilled in the art will appreciate that the invention may be practiced with various computer system configurations, including hand-held wireless devices such as mobile phones or PDAs, multiprocessor systems, microprocessor-based or programmable consumer electronics, minicomputers, mainframe computers, network clusters, multi-node systems, and the like. The invention may also be practiced in distributed computing environments where tasks are performed by remote processing devices that are linked through a communications network. In a distributed computing environment, program modules may be located in both local and remote computer storage media including memory storage devices.

The computer system may include one or multiple general purpose computing devices in the form of a computer including a processing unit, a system memory, and a system bus that couples various system components including the system memory to the processing unit.

Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™@operating system, an Open-Step™ operating system or another operating system or platform.

At a minimum, the memory includes at least one set of instructions that is either permanently or temporarily stored. The processor executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, unit, or tool. The invention may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, Objective-C, COBOL, Forth, FORTRAN, Java, Modula-2, Pascal, Perl, Prolog, RUM Visual Basic, and/or JavaScript for example. Further, it is not necessary that a single type of instruction or programming language be utilized in conjunction with the operation of the system and method of the invention. Rather, any number of different programming languages may be utilized as is necessary or desirable.

Also, the instructions and/or data used in the practice of the invention may utilize any analytics purpose-built compression or anonymization technique or algorithm, as may be desired. An anonymization module might be used to anonymize data. Further, files or other data may be decrypted using a suitable decryption module.

The computing environment may also include other removable/non-removable, volatile/nonvolatile computer storage media. For example, a hard disk drive may read or write to non-removable, nonvolatile magnetic media. A magnetic disk drive may read from or writes to a removable, nonvolatile magnetic disk, and an optical disk drive may read from or write to a removable, nonvolatile optical disk such as a CD ROM or other optical media. Other removable/ non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed microprocessor, microcontroller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

A user may enter commands and information into the computer through a local or remote user interface that includes input devices such as a keyboard and pointing device, commonly referred to as a mouse, trackball or touch pad. Other input devices may include a microphone, joystick, game pad, satellite dish, scanner, voice recognition device, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, OSI, or InfiniBand for example. For wireless communications, communications protocols may include Bluetooth, Zigbee, IrDa or other suitable protocol. Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the present invention.

More specific embodiments of the present invention, III the nature of business intelligence methods and computer program products, are now described for the purpose of providing users with detailed information concerning their available business data to enable informed decisions about how to manage and conduct business. With reference to the figures, in which like reference numerals represent like items throughout the views, various embodiments of the invention will be described in detail.

The various embodiments and aspects of the present invention provide for systems and methods of creating and operating advanced database systems and models. Such models may be utilized in the aggregation of large-scale data warehouses and the implementation of robust analytics platforms to act upon such data. These models may further be used to create or operate a data warehouse and analytics platform for simultaneous use by multiple, disparate data owners and stakeholders.

According to one of the many embodiments of the present invention, a database is provided which examines incoming data elements in order to identify a set of optimal processing activities to be initiated upon each data element in order to store the data elements in the database. Data elements may be, depending on the information contained therein, either replicated in a majority or all nodes or spread amongst nodes in the database model. In one aspect of the invention, metric-based data may be spread while attribute-based data may be stored locally in a majority or all nodes. Other embodiments and aspects of the invention may employ a determination module to determine whether a data element is to be spread or stored locally in the advanced database.

Figure 3A:
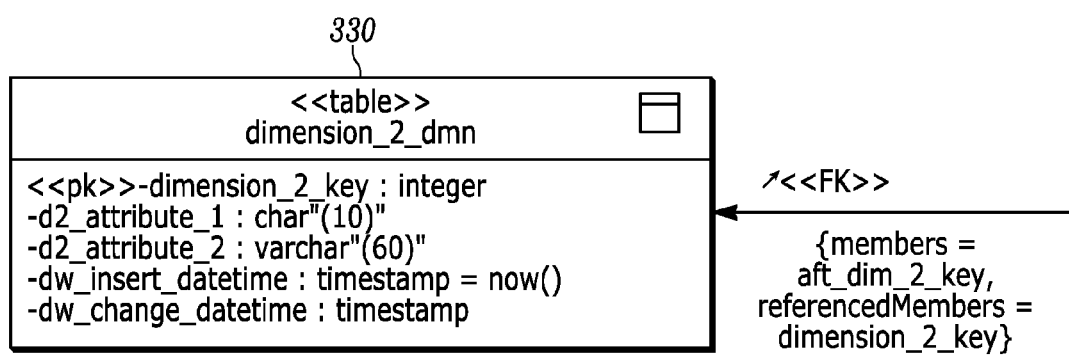
FIGS. 3A-3C illustrate an exemplary business intelligence data model for use with embodiments of the present invention.
Figure 3B:
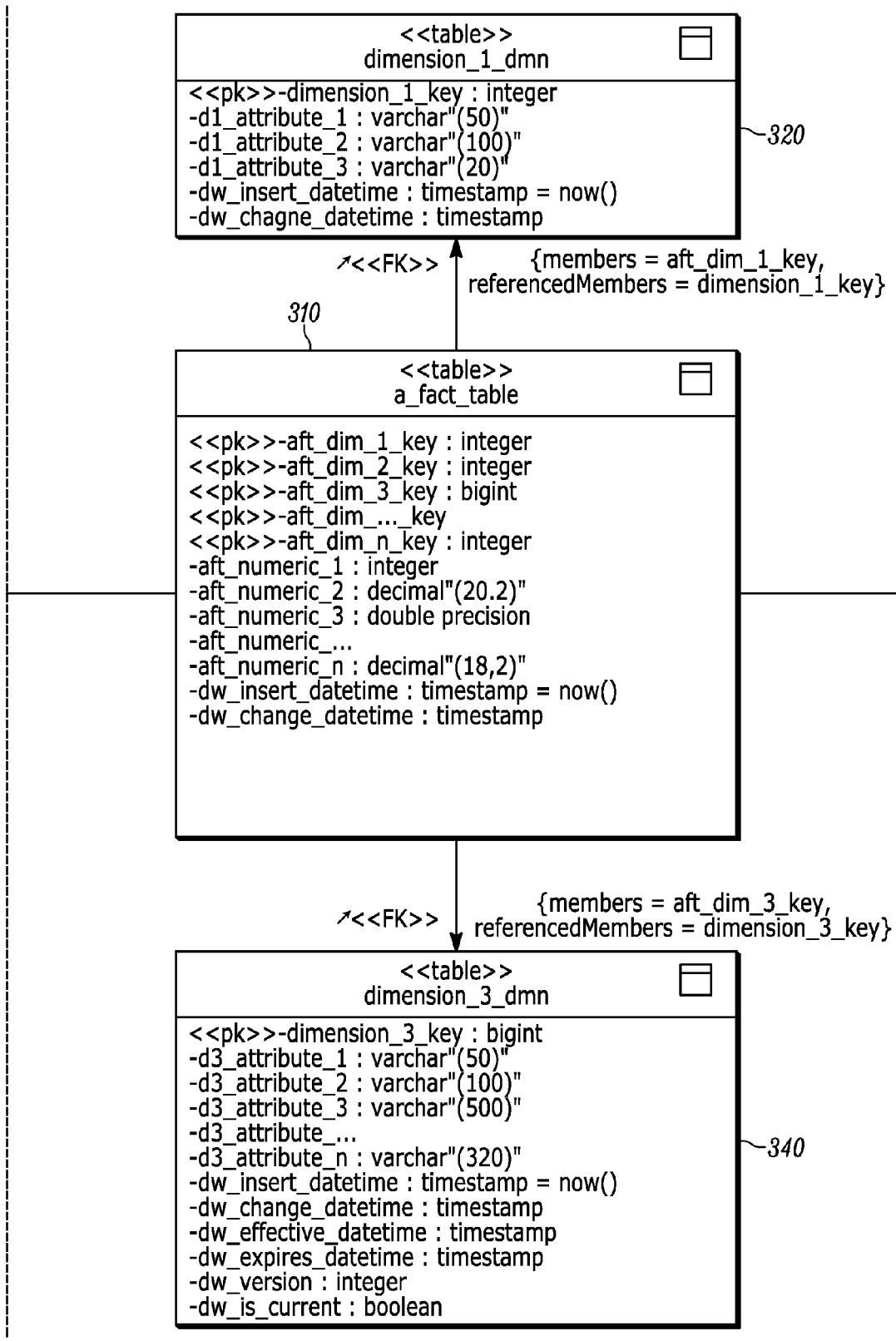
Figure 3C:
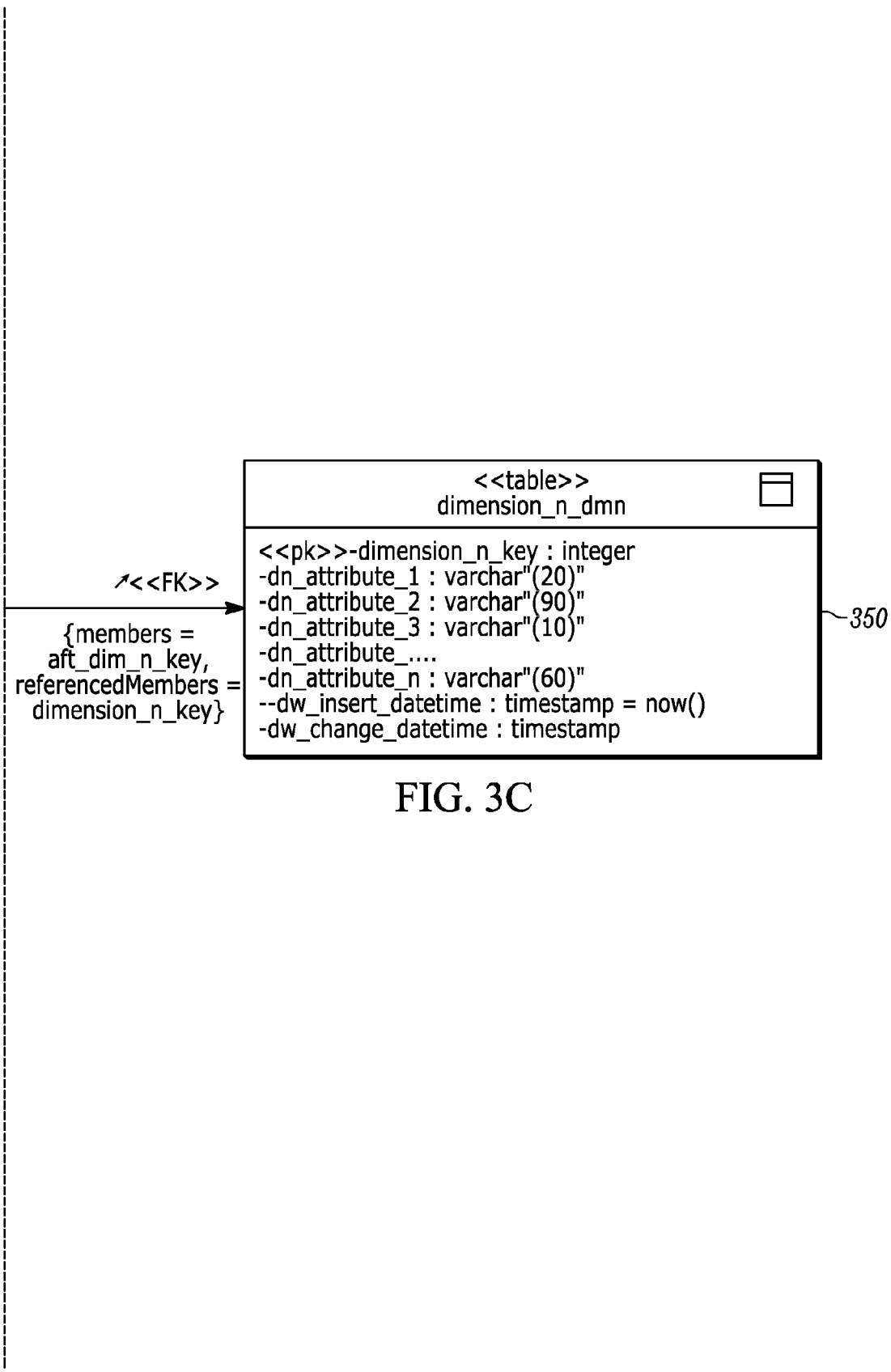

FIGS. 3A-3C illustrate an exemplary data model specifically designed for business intelligence. Metric data are stored in the fact table 310 located in the center and attribute data are stored in the dimensional tables 320, 330, 340, and 340 and are related to fact table 310.

Selective Spread of Data Elements

Looking to FIG. 1, according to some aspects and embodiments of the present invention, an advanced database system 100 may utilize a data distribution engine 116 to selectively distribute metric-based data, or fact table data, amongst a plurality of database nodes 120, 130, and 140. Fact table data may be distributed amongst the database nodes according to a distribution schema. The distribution schema may utilize many different distribution methods that may be appreciated by those of ordinary skill in the art.

One distribution algorithm that may be used for spreading of data elements is a round-robin distribution. Under this distribution, each successive data element is stored in each successive node in sequence. Another conventional distribution algorithm that may be used is a random distribution, under which each data element is stored in a randomly selected node. A preferred distribution algorithm is one that guarantees even distribution of data, and neither the round-robin nor the random distribution algorithms guarantee even distribution of data in a multi-tenant application service provider for business intelligence While conventional multi-node data distribution algorithms and database models distribute incoming data amongst available nodes in order to generally prevent any individual node from being overtaxed, such a distribution scheme fails to perform optimally when multiple disparate data owners and stakeholders utilize the same data warehousing and analytics system in a multi-tenant manner. Accordingly, embodiments of the present invention contemplate spreading fact table data on a per-owner or per-subject basis across a plurality of the available database nodes 120, 130, and 140. In such an embodiment, the data distribution engine 116 will spread data intelligently amongst a plurality of available nodes such that the data for any individual data owner or stakeholder is optimally distributed amongst those nodes—such as in tables 121, 131, and 141 via chunks 122, 132, and 142. Such distribution may be irrespective of the data distribution of other data owners. In other scenarios, the overall distribution of all data may inform the available nodes for a single data owner or stakeholder, while fact table data of the single data owner or stakeholder are then optimally distributed amongst those available nodes. In one exemplary aspect, the fact table data may be distributed evenly in size amongst the available nodes. In another exemplary aspect, the fact table data may be evenly distributed in relation to historical frequency of access in order to evenly spread predicted access requests amongst the various utilized nodes.

Figure 2:
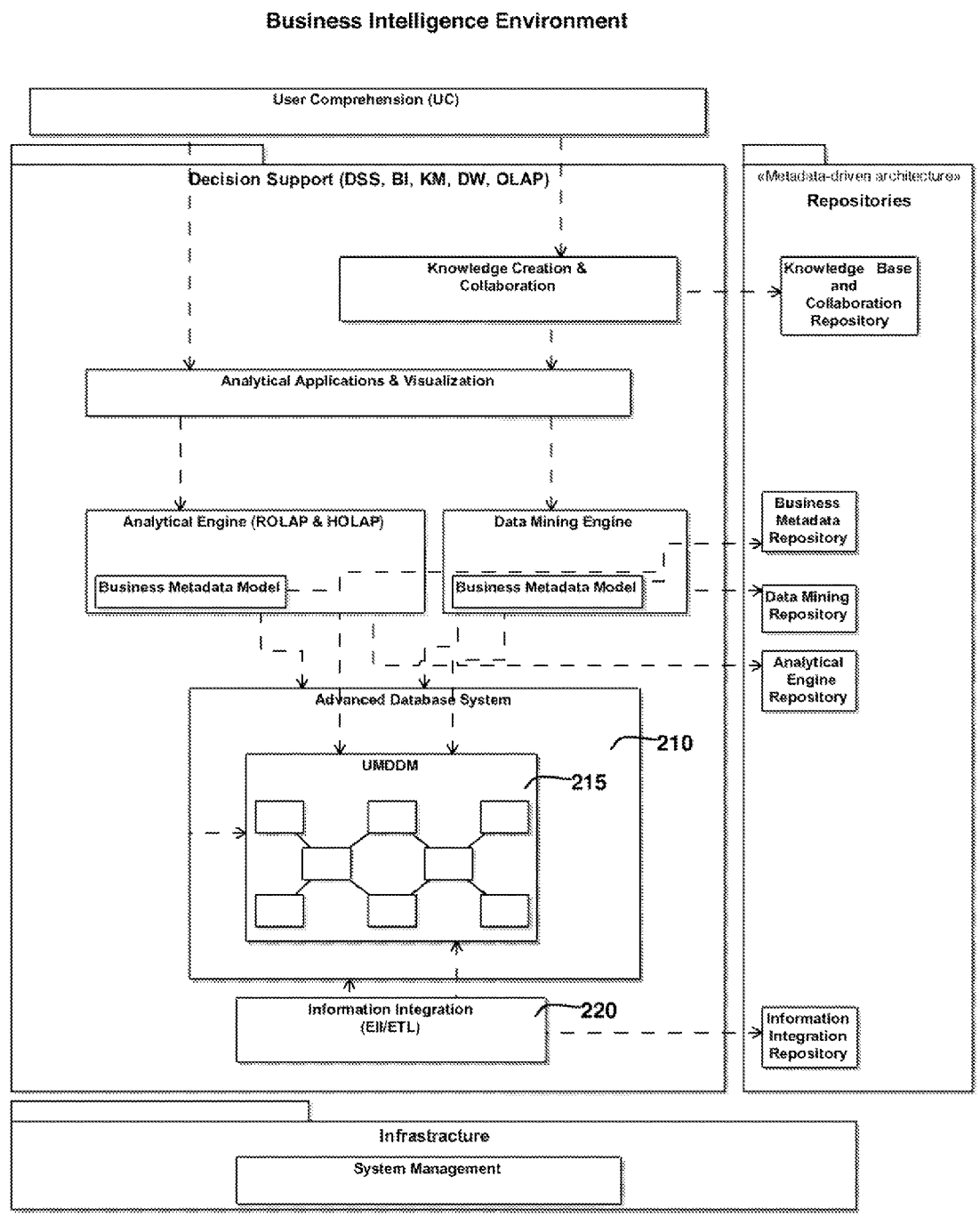
FIG. 2 is a schematic diagram of an analytics and decision support architecture employing advanced database models according to embodiments of the present invention.

According to embodiments of the present invention, the database receives a data element from a data loading engine, such as information integration 220 in FIG. 2, and performs data validation of the data element according to a data model 215. The data model can either be created before the data element is processed or it can be created dynamically based on business problems related to decision support answers. This data model describes how the data element is related to other data elements for business intelligence analytics for a high-performance application service provider environment. The data model may be designed so that the data element may be uniquely identifiable by a data field that will be created and have its value assigned by the advanced database system and which may not be externally visible to the data model. In other embodiments the data model may be designed so that the data element is uniquely identifiable by a data field whose value will be visible and assigned by the data loading engine, or whose value will be visible and assigned by the data distribution engine 116.

The database also performs data validation of the data element according to the unique identifier of the data element. A database storage node, such as storage node 120, receives a data element, examines it, and validates if the data element should be stored in the storage node that received it. The validation occurs based on the value of an existing unique identifier field of the data element if the data loading engine assigned such a value to this unique identifier, or on a value assigned by the advanced database system. This validation may optionally also occur based on the set of existing unique identifiers assigned to other data elements, or on the last unique identifier assigned, either for the subject area the data element belongs to or amongst multiple subject areas. When the validation is successful the data element is stored on the storage node.

The database storage node that will be used to store a data element is identifiable by the value assigned to the unique identifier of the data element assigned by data distribution. With some data distributions, like a random distribution, the database storage node cannot be identified based on the unique identifier and the advanced database system must be queried to identify the storage node. With other data distributions, like a hash-based distribution, the database storage node can also be identified based on this unique identifier value.

When the database system receives an analytical or access query, it may access one or more database storage nodes to answer the query according to the distribution function used for selective data spread of data elements.

For improved performance in storing data, database storage nodes may receive data elements either in a single batch or as a sequence of data element insertions. It is not necessary for data elements to be received in sequence based on the unique identifier of the data element. Data elements can also be loaded in parallel without waiting for other data elements in other database storage nodes to be loaded.

In many aspects of the invention a data distribution engine allocates rows in fact tables for each individual subject area of the system. Exemplary subject areas may consist of sales, logistics, marketing effectiveness, user interactions or posts, customers, data owners, or data stakeholders of a multi-tenant data warehousing and analytics service. The data distribution engine 116 may distribute these rows as a contiguous range across the various nodes in order to improve throughput of access of the database. This advancement in throughput may be especially noticeable in the context of a multi-tenant database-dependent service offering, where a sparse allocation method would involve additional processing to analyze stored data. The allocation by the data distribution engine may also be flexible such that the size of each contiguous range is dynamically adjustable. As a database of the present invention is utilized and data is accessed through various analytical or access queries, the storage allocation range may be adjusted in order to tune the performance requirements of the overall system.

The allocation is flexible in that any amount of records may be stored during each allocation without requiring this amount to be known a priori. The unique record identifier (such as row id) of each data element of each subject area in a fact table is allocated as a monotonically increasing number that can have gaps. The allocation is divided into a startup phase where records of a subject area are added for the first time, and into an incremental phase where records of this same subject area are appended to the existing set of records.

When records are allocated for the first time, the first unique record identifier used for the first record is the first record identifier that is available for use in the table (the next number in the sequence).

Figure 4A:
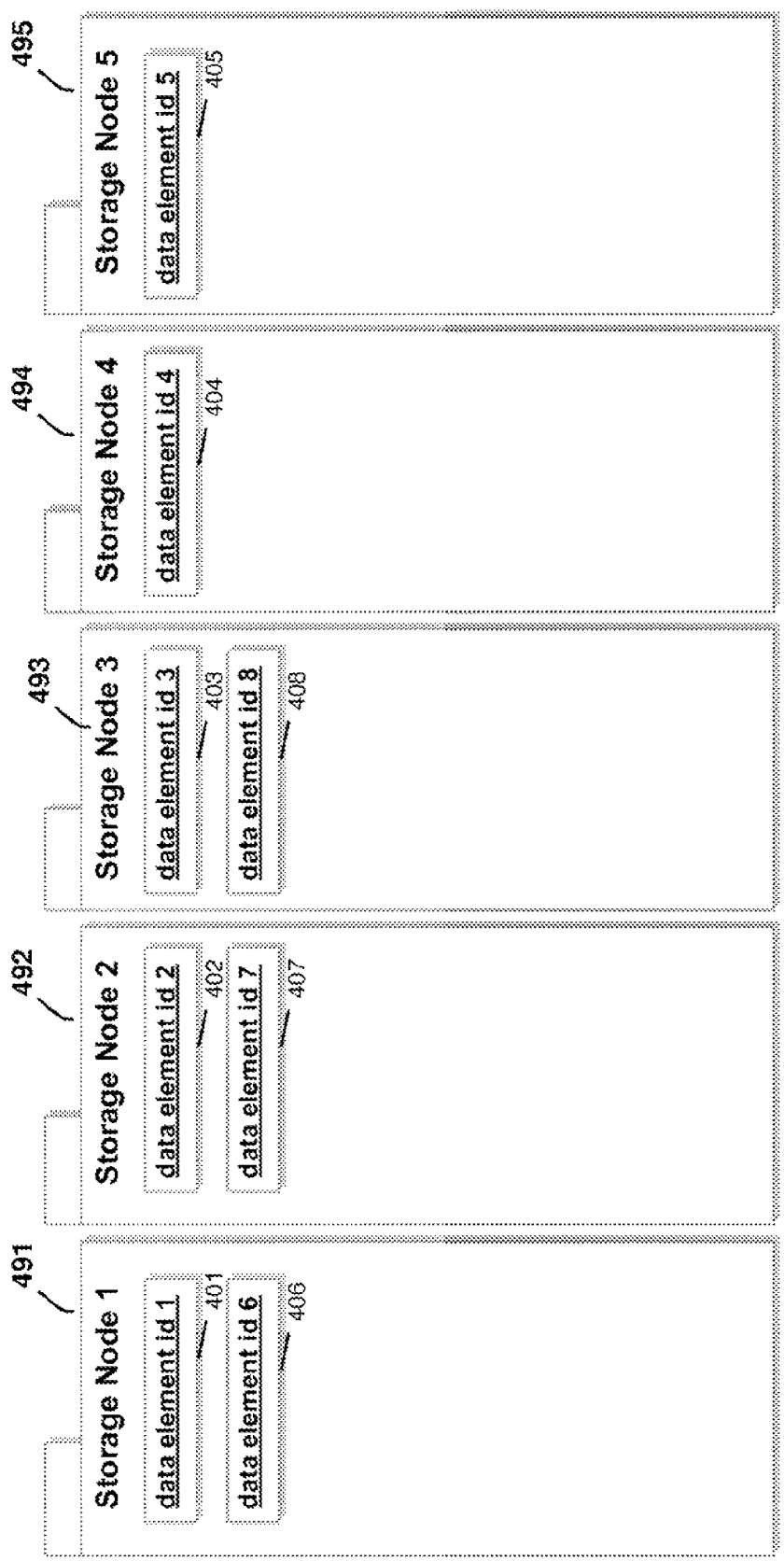
FIG. 4A is an example record allocation of eight data elements in an exemplary five-node storage system according to an embodiment of the present invention.

FIG. 4A is an example record allocation of eight data elements for the first time in a five-node sample storage system. The first data element 401 receives the first record identifier that is available for use for the table of this data element which happens to be unique identifier 1. This identifier indicates the data element should be stored on storage node 1 (491). The second data element 402 receives the next unique identifier in the sequence which is identifier 2. When data element 6 (406) is allocated the next available unique row identifier, that identifier indicates allocation rolls over to continue from the first storage node 1 (491).

When records are appended, the unique record identifier is allocated with a formula that considers the number of storage nodes and any additional records stored for other subjects. Assuming the last unique record identifier for this subject is X, the last unique record identifier of the entire table is Y, and the number of nodes in the system is N, the next unique record identifier is given by the pseudocode:

allocate(X, Y, N):

$$\text{last\_node} = X \bmod N$$
$$\text{current\_node} = Y \bmod N$$
$$id = Y - \text{current\_node} + \text{last\_node} + 1$$
$$\text{if current\_node} > \text{last\_node}$$
$$id = id + N \quad (1)$$

return id

This allocation may not simply use the next unique record identifier in this append phase because in a database system for an application service provider it is practically guaranteed that there will be records of other subjects that have been stored after the records initially loaded for one subject area. There is no limit to the number of incremental phases of the allocation.

Figure 4B:
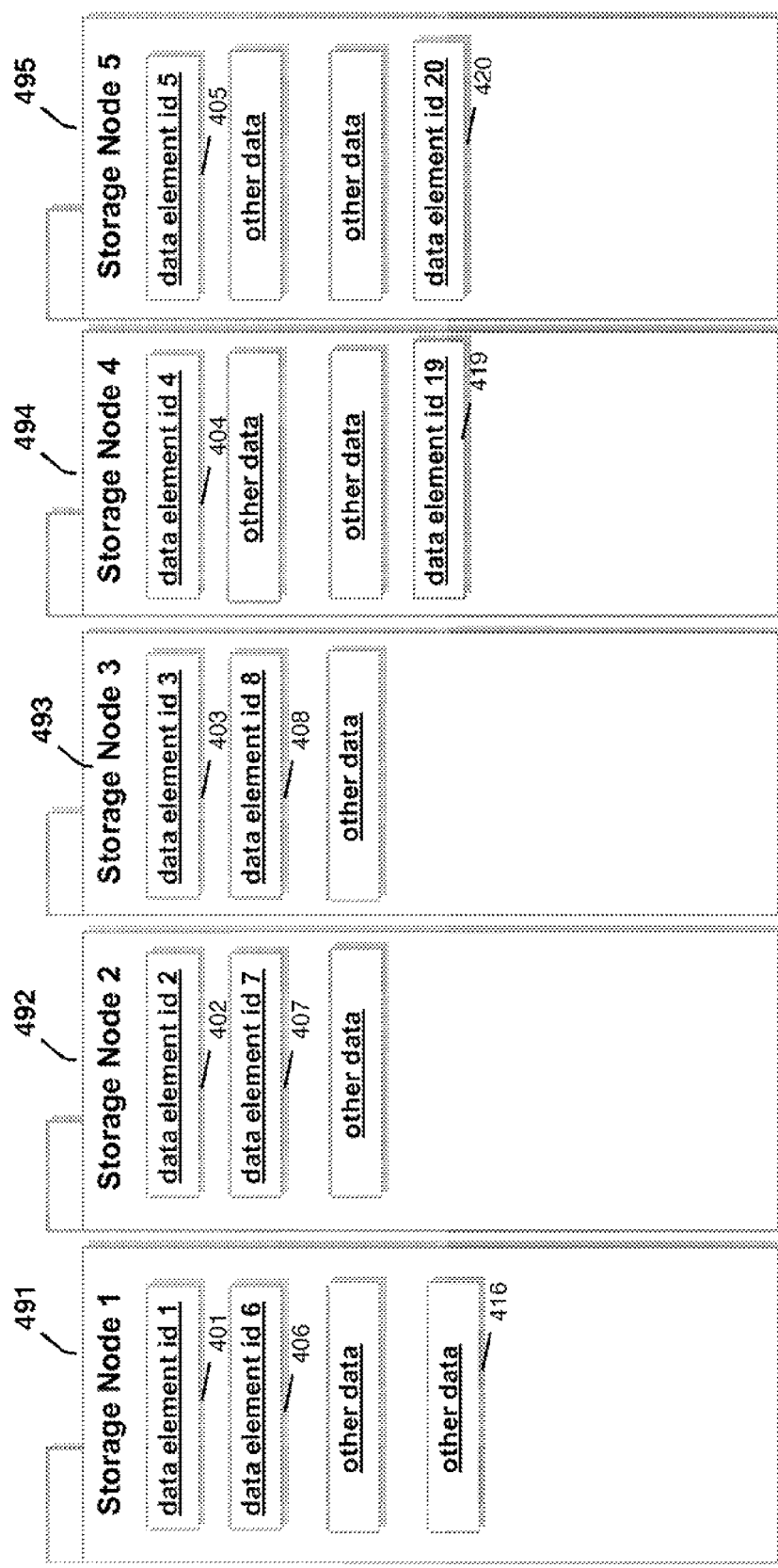
FIG. 4B is an example record allocation appending two data elements to an existing initial allocation of eight data elements in a sample five-node storage system according to an embodiment of the present invention.

FIG. 4B is an example record allocation appending two data elements to an existing initial allocation of eight data elements in a sample five-node storage system. Since the first allocation of eight data elements, additional data elements belonging to other subject areas or customers have been allocated in the system. The unique record identifier of the first data element that will be appended is calculated to use the next unique record identifier on the next available storage node that will maintain even data distribution, which is storage node 4 (494), and the identifier is 19 (being stored as data element 419). The second data element appended has row identifier 20 (being stored as data element 420.

In this example, this calculation leaves a gap in the sequence of all unique identifiers used for this subject area or customer. Whereas the last unique row identifier used for the last data element in the table was 16 (as other data 416), row identifiers 17 and 18 remain unused and the next used identifier is 19.

Any gap in row identifier numbers does not impact the ability of the data distribution to remain even for a different subject area since the same allocation algorithm is applied for each individual subject area or customer.

Figure 4C:
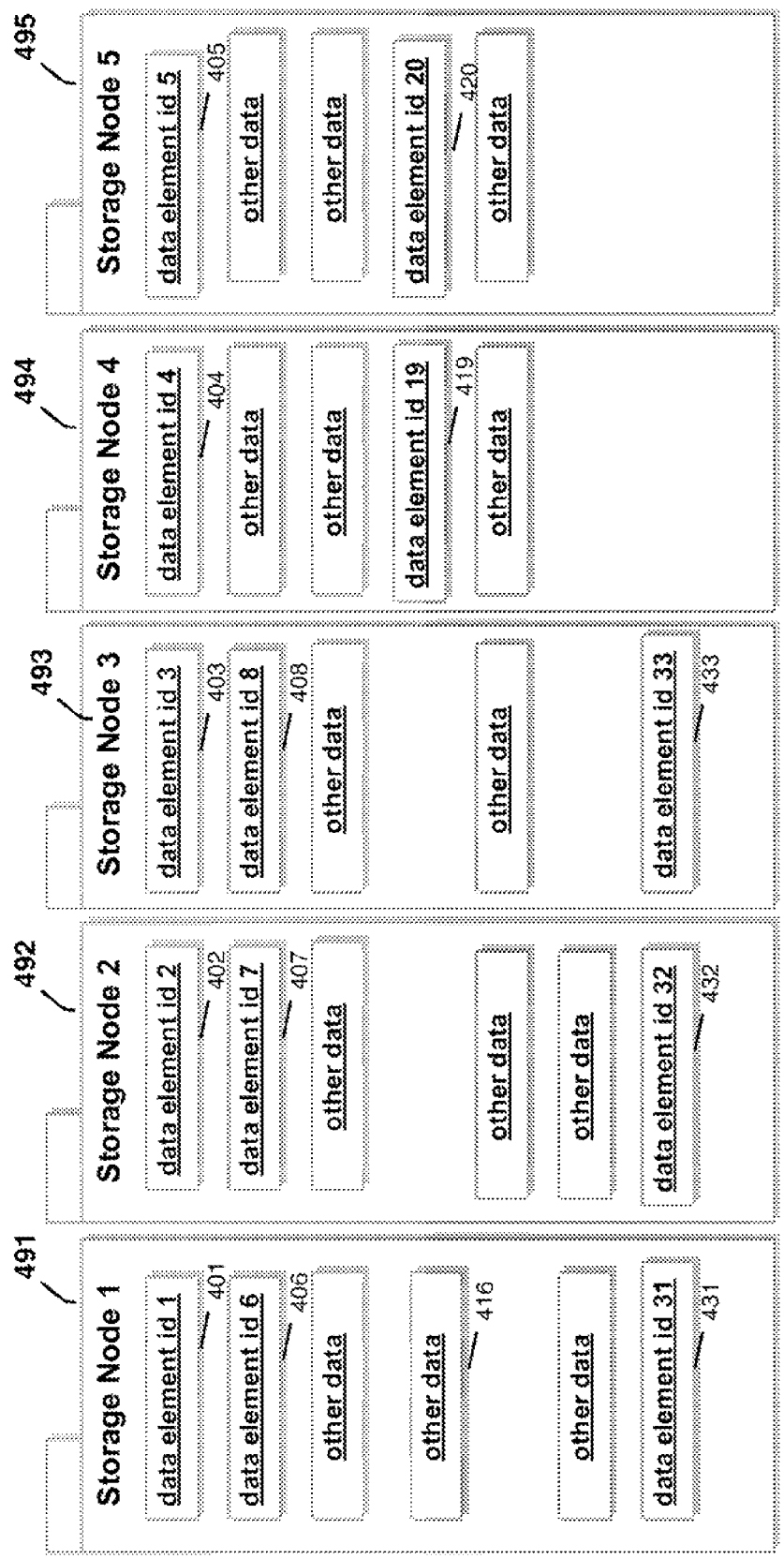
FIG. 4C is an example record allocation in a second append phase in a sample five-node storage system according to an embodiment of the present invention.

FIG. 4C is an example of a second append phase. Data appended for other subject areas are also allocated on the next storage node that will preserve even data balance. Appending data elements 431-433 allocates the elements on the next storage nodes 491-493 that will preserve even data balance for this subject area or customer irrespective of the data distribution of other subject areas or customers.

Based on the optimal allocation methods implemented in a data distribution engine of the present invention, the variance in query execution time amongst each of the plurality of database nodes in an overall system or cluster may be minimized for each of the subjects stored thereon and accessing thereof. For each subject accessing the exemplary database and analytics system, a subject query will result in an even examination of data elements across all of the plurality of nodes available to the subject due to the proportionate spread storage of those elements. Those of skill in the art will recognize this as an improvement over traditional database distribution methods which distribute data across all subject areas instead of on a per-subject basis. Accordingly, the data skew for an individual subject, which is commonplace in traditional data distribution schema well-known in the art, is practically eliminated with a distribution schema of embodiments of the present invention.

Data Redistribution for Capacity Expansion

Storage capacity may be extended through the addition of storage capacity in each local node and through the addition of distributed storage nodes. When adding distributed storage nodes, some or all of the data in the existing storage nodes are redistributed on the new storage nodes to restore an even balance of data. The set of new storage nodes may be inclusive of the set of old storage nodes, such as when adding new nodes to an existing old set of nodes to expand the set.

According to embodiments of the present invention, the data redistribution is performed per subject area or customer since it is by storing data per subject area or customer that an even distribution is achieved. Achieving an even data balance restores the advanced database system to minimizing the variance in query execution time amongst each of the plurality of database storage nodes.

In one embodiment of the invention data redistribution extracts data elements from one or more storage nodes per subject area or customer amongst the original set of storage nodes and stores each data element in a specific storage node in the new set of storage nodes. Before storing the data elements in the new set of storage nodes, the old data elements may be stored in a temporary storage location and removed from the old set of storage nodes in order to make sufficient room in the old set of storage nodes. In another embodiment of the invention each data element may be stored directly from the old set of data nodes to the new set of data nodes without being transferred through an intermediate temporary storage location.

The workflow of redistribution begins when a redistribution engine begins retrieving data elements from the old set of storage nodes. This redistribution engine may reside within the advanced database system or it may be a separate system. An existing data distribution engine, such as data distribution engine 116, may also be used as a data redistribution engine.

The redistribution engine examines the unique identifier of each data element used for data distribution and either reuses the unique identifier for storage on the new set of data storage nodes or changes the unique identifier. The unique identifier may be changed according to the existing data allocation formula but with the difference that whereas the number of nodes used to generate the unique identifier was N, the number of nodes is now N+M where M is the number of new nodes added in the set. In this sense data redistribution is similar to the startup phase of data allocation. Redistribution may use as its first unique identifier a brand new unique identifier, such as the number 1, or it may use as its first unique identifier an identifier that was not present amongst the data elements in the old storage nodes at all and resume generation of identifiers from that number.

FIGS. 5A and B illustrate an example data redistribution in a sample storage system of five nodes that is extended in capacity to seven nodes. Data elements 501-508, shown in FIG. 5A, are distributed to the extended storage nodes, shown in FIG. 5B, while keeping their unique identifiers intact. Subsequent data elements 519-520 have their unique identifiers regenerated to continue from the next available unique identifier in a sequence, identifiers 9-10. Similarly, data elements 531-533 are redistributed with new unique identifiers 11-13. Any gaps in the old row identifiers do not impact the ability of the data distribution to remain even in the new distribution.

After data elements for a subject area or customer are redistributed, additional subject areas or customers are redistributed. The redistribution is complete when data elements of all subject areas or customers are redistributed.

Dimensional Parallelism

In certain embodiments of the present invention, the data distribution engine 116 may further manage dimensional table data, or attribute-based data, amongst the available nodes for each individual subject in the schema. Dimensional table data may be parallelized in a manner providing for dimensional tables to be stored in their entirety in each of the subject-utilized plurality of nodes. Aspects of the invention contemplate dimensional tables stored using tuned compression techniques, some of which may be tuned for analytics applications, which may be appreciated by those of ordinary skill in the art. Advantageously, the duplication of dimensional tables across all utilized nodes provides for local execution of join operations between tables, completely eliminating the network overhead typically present due to data-motion amongst storage nodes. Such advantages may be realized in multi-tenant and multi-subject database systems, such as those involved in commercial application services.

When a query is received by the database system 100, the query is parallelized for execution on a plurality of storage nodes 120, 130, and 140 by parallel query planner 112 and intermediate query steps are sent for local execution on the storage nodes by query executor 114. The intermediate query step may require accessing data from a dimensional table, from a fact able, or from a combination of such tables. Queries for business intelligence analytics often require accessing a fact table and one or more dimensional tables.

When an intermediate query step is executed that requires accessing both a dimensional and a fact table to answer, the data from the dimensional and the fact table are joined together in a data buffer locally on the database storage node. For example, fact table 121 may be joined with dimensional table data 126 or 127. The join operation does not require accessing data from other storage nodes to process the intermediate query step.

The join operation of the intermediate query step may use decompression techniques over the dimensional tables that improve performance of answering the query step. The decompression techniques can examine metadata that describe which parts of the lower-level storage blocks are either needed or likely needed to answer the query. The metadata may vary depending on the datatype of the data elements, such as numeric data elements or alpha-numeric elements, and depending on whether the metadata describes relations between elements of different tables.

While the join operation between the fact table and a dimensional table executes, join operations between the fact table and other dimensional tables required for answering the intermediate query step are also executed in parallel.

Figure 6:
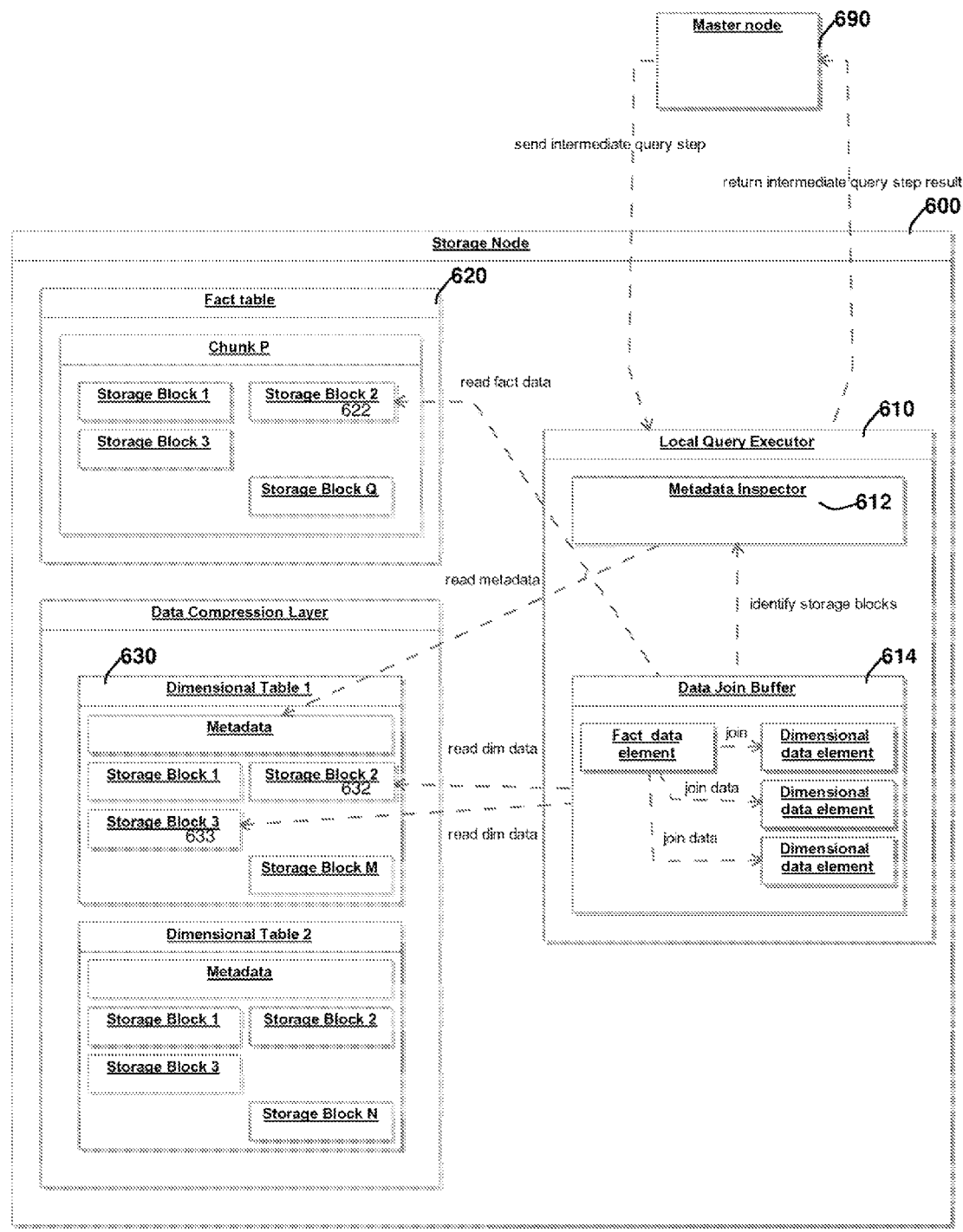
FIG. 6 is an example storage node with a local query executor that joins fact and dimensional data according to an embodiment of the present invention.

FIG. 6 is an example storage node 600 with a local query executor that joins fact and dimensional data. The local query executor 610 contains a metadata inspector 612 that identifies the storage blocks that should have their data joined—such as storage blocks 622, 632, and 633. The data blocks are accessed from the fact table 620 and the dimensional table 630, placed in a data join buffer 614 that joins the data, and returned to the master node 690 when the intermediate query step completes.

Optimization Compression of Data Elements

According to some aspects and embodiments of the present invention, an advanced database system may utilize a data compression engine to compress data elements according to the performance needs of the advanced database system. In certain embodiments, the data compression engine may dynamically alter its compression schema based on intelligence gathered during real-time use of the system.

The data compression engine may monitor and evaluate queries and query results returned through the real-time performance of the advanced database system in order to gain insights about the nature and use of the data being performed by users. Typically, such analysis was performed by a general-purpose database analyzer which used statistical information to plan a query. However, embodiments of the present invention may proactively predict which kinds of queries are likely to be asked of the database system in the future based on machine learning aspects of the engine. Upon prediction, the data compression engine may cause the rearrangement of low-level storage allocations in order to increase performance of the database system.

Certain aspects of the invention contemplate a compression optimizer 105 performing an evaluation of the final query results returned in each of the individual subjects. Further evaluations of intermediate results returned through each individual data node utilized by each individual subject, which may have been parallelized in the operation of the query, may be performed by the engine as well.

The evaluation for selective compression considers intermediate query results. The major attributes of concern to the evaluation of intermediate results are whether a data element is numeric or alpha-numeric, and the relations of data elements.

For numeric data elements, the evaluation considers the statistical distribution that best characterizes the data elements. It identifies ranges of numeric values in the distribution that have no data elements and creates metadata that indicate the ranges of numeric values that have data elements. The granularity of the data distribution is also configurable to drill down into ranges with high frequencies of their numeric values.

For alpha-numeric data elements, the evaluation identifies occurrences of specific alpha-numeric patterns or specific characters at specific positions of a data element. It creates metadata that indicate the presence or absence of such patterns.

For relations of data elements, the evaluation tracks presence or absence of the unique identifiers of rows from the relations of the data elements.

These metadata are important because they are consulted to access and decompress only the low-level storage blocks needed to answer the query. More accurate metadata means decompressing less low-level storage blocks, which translates into faster query execution time. Optimized metadata are valid for the current set of data elements they examine. When new data are loaded, the metadata are verified for validity and discarded in part if necessary.

As a result of the evaluations conducted by the data compression engine, post-optimization storage tuning hints are generated, which account for the induced workload and for the dimensionality and selectivity of the queries being asked of the database system. In the analytical context, such queries may be business questions. The tuning hints identify and suggest which compressed data areas should have their metadata revised. Tuning hints may further identify the statistical operations and granularity with which the underlying data should be inspected to be re-compressed pursuant to compression schema. Hints may be scheduled for execution at each of the database nodes in the advanced database system, such that the low-level storage layer in each data node may apply the tuning hint to each node unobtrusively based on system performance and demands.

Accordingly, many of the various embodiments of the present invention allow the compression of metadata in the advanced database system to be varied. Utilizing a feedback loop from the various nodes in the system, dynamic reallocation of compression may be varied. Compressed groups of data and of their metadata may be reconstructed or have new collective insights to the nature and use of the data appended to metadata. Such insights may provide for metadata to answer subject queries more efficiently, and therefore quicker, since they may determine with better accuracy which groups of data should be uncompressed on each of the various nodes Illustrative Example An illustrative example of an embodiment of the present invention considers answering business intelligence questions using the advanced database system in the retail field for a plurality of customers. Data of the retail field are modelled with a data modelling schema that describes the relations of the data. The data are extracted from their data sources, transformed according to the model, separated between dimensional data and fact data, and loaded in the advanced database system.

Figure 7A:
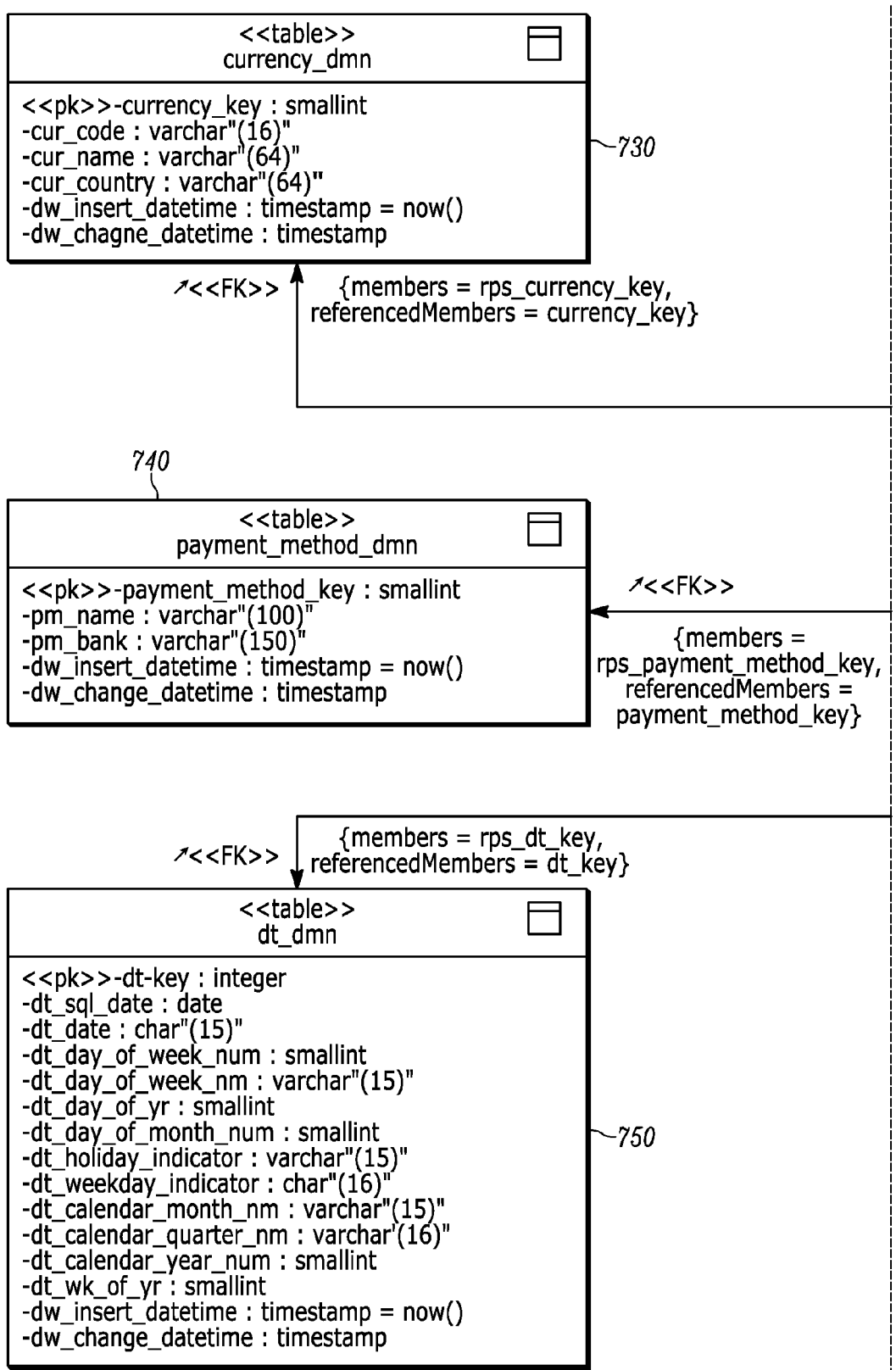
FIGS. 7A-7C illustrate an example database model for use in the retail field according to an embodiment of the present invention.
Figure 7B:
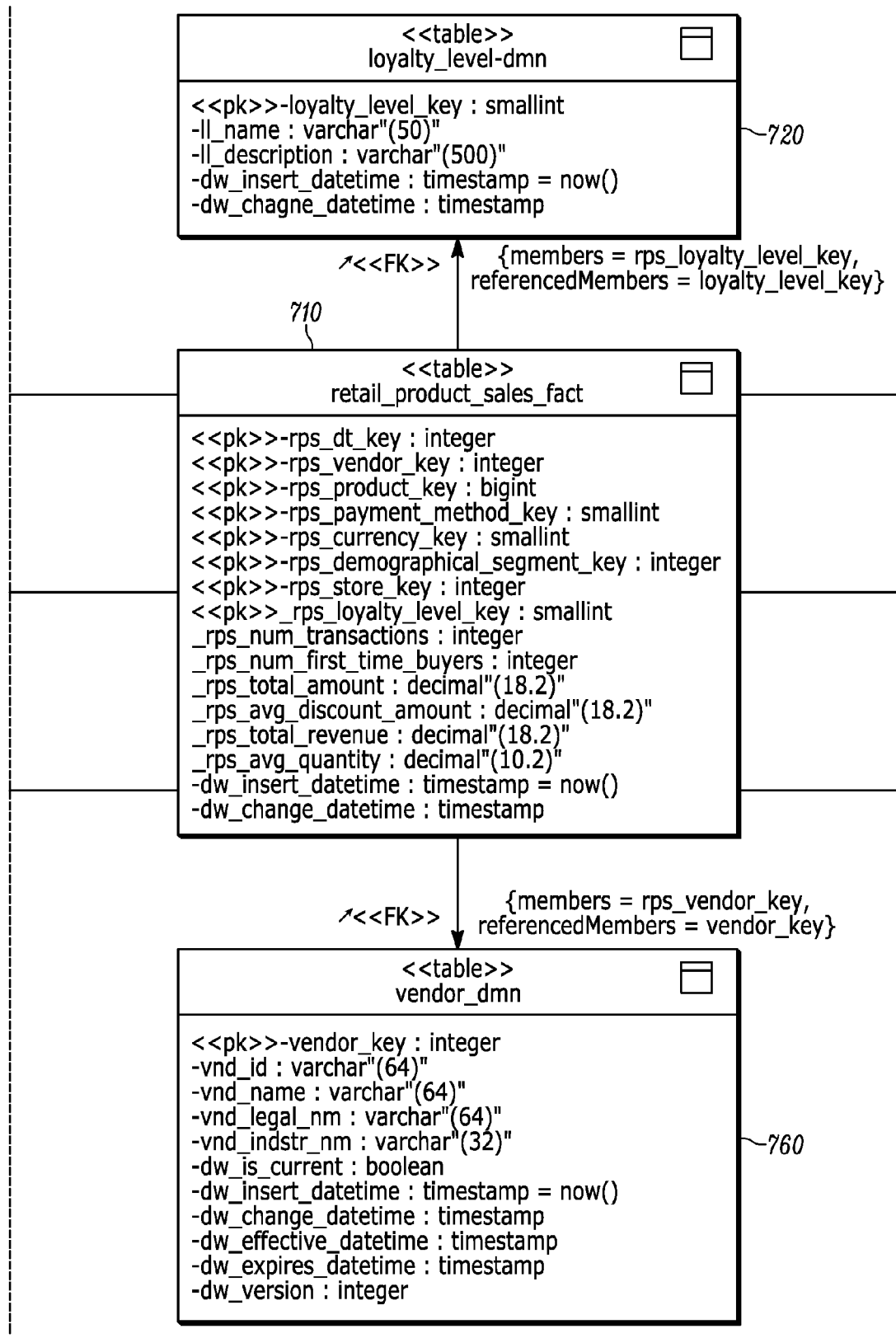
Figure 7C:
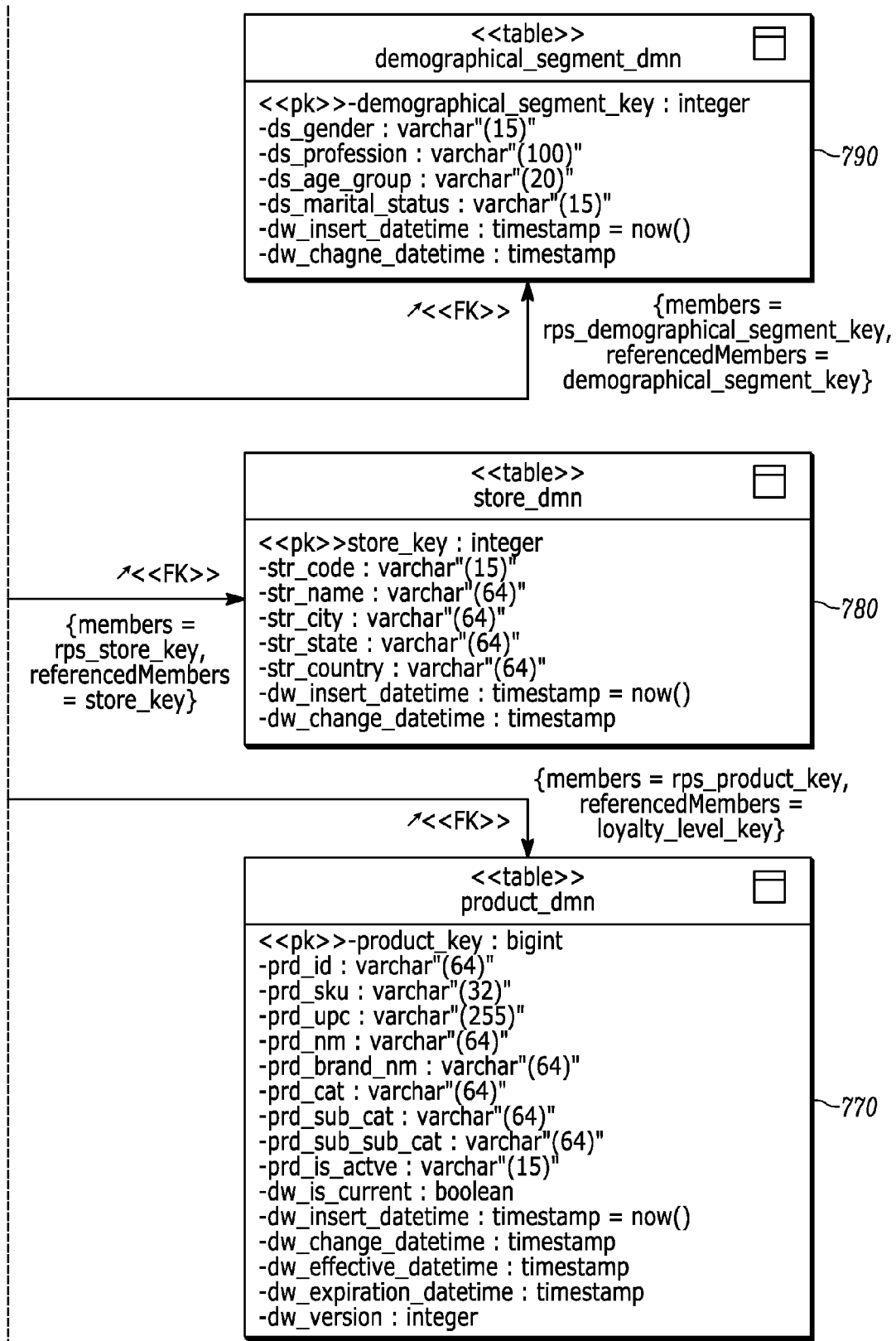

FIGS. 7A-7C illustrate an example database model for application of the invention in the retail field according to aspects and embodiments of the present invention. The database model separates between eight dimensional tables and one fact table to which the dimensional tables are related. The dimensional tables indicate attribute data such as the date of a payment, a product description, the store to which a product is available for purchase, the payment method available for purchase, the currency with which payments may occur, the loyalty level of customers, and the demo graphical segment to which customers may belong. The fact table indicates analytical information about product sales as related to the dimensional tables and includes metric data. The metric data refer to a granularity over a date period, such as over a specific date, over a week, over a month, over a quarter year or over a year. Example metric data are the number of transactions over a specific date, the total amount of sales over a week, the total amount of revenue over a quarter year or the average quantity of sales over a year.

The first kind of data received by the database to store are dimensional data. Database storage nodes each receive a copy of dimensional data and store the entire copy in the node. The dimensional data are received either in parallel or sequentially into the database storage nodes.

Fact data may be received for storage after dimensional data has been stored. In this example, during the data distribution process the advanced database system automatically assigns a new unique identifier for each data element of the fact table that is not visible to the database model. In another embodiment of the database model this unique identifier is part of the database model without affecting the data loading process.

When data are stored in the database storage nodes, the data may be automatically compressed by the database storage nodes so the dimensional data fit in their entirety in each database storage node. If compression is used, the compression is purpose-built for analytics so that answering queries occurs by decompressing data with improved performance.

When a user issues an analytical query to the advanced database system 100, the database examines the query and creates a query plan at parallel query planner 112 that can execute the query in parallel on a multitude of database storage nodes. The query plan is executed by a query executor 114 that coordinates execution of each parallel query step on the database storage nodes. Intermediate query results from each database storage node are sent back to the query executor 114 that combines the query results into a single result with additional processing if needed.

Each parallel query step is executed on the database storage nodes and may include processing of data from either dimensional or fact tables. A query that requests a report of product sales over a specific date which includes processing of the retail~roduct_sales_fact fact table 710, the dt_dmn dimensional table 750, and the product_dmn dimensional table 770 using an operation that combines data from these three tables. This query expressed in SQL format is:

SELECT p.prd_nm, d.dt_date, r.rps_total revenue
    FROM product_dmn p, dt_dmn d, retail_
    roduct_sales fact r WHERE r.rps_product
    key=p.product_key AND r.rps_dt_k=d.dt_key
    AND d.dt_date='11-27-2011' ORDER BY
    p.prd_nm                                        (2)

When this intermediate query step is executed, join operations for this query are executed locally on database storage nodes. For example, the data join of retail_product sales fact 710 with dt_dmn 750 happens in its entirety on each database storage node without need for the storage node to communicate with other storage nodes to execute the join operation. This join operation may use decompression techniques to examine only metadata that describe which parts of the data will be included in the join operation. While this join operation executes, the data join operation of retail_ product sales fact 710 with product dmn 770 also executes in parallel and the results of these two join operations are combined together before being returned to the query executor 114.

When the query executor 114 receives results from the storage nodes it processes and combines the results before returning them to the customer. For example, each intermediate query result returns a report for one or more individual products that were stored through the data distribution process on each database storage node. Product reports are combined together and sorted according to the product name (prd_nm) before the query results are returned.

Having described a number of different embodiments of the invention, it should be apparent to the person of ordinary skill in the art that the invention has numerous benefits and advantages. For example, a database may be provided for a business intelligence system which allows for efficient storing of data and rapid analytical processing of that data.

Other benefits and advantages of the invention will be apparent to the person of ordinary skill in the art.

Other embodiments and uses of this invention will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The invention claimed is:

1. A computing system comprising:
   memory comprising executable instructions; and
   a processing device operatively connected to the memory, the processing device configured to execute the executable instructions in order to effectuate a method comprising:
   obtaining a first set of data belonging to a first data owner, wherein the first set of data comprises a plurality of data elements;
   obtaining a second set of data belonging to a second data owner, wherein the second set of data comprises at least one data element, and wherein the second data owner is different than the first data owner;
   distributing at least a portion of the first set of data and at least a portion of the second set of data sequentially among at least two system nodes, in data elements of substantially uniform size, wherein distributing the data sequentially comprises:
   distributing at least one data element from the first set of data belonging to the first data owner sequentially from a first node to a last node;
   distributing the at least one data element from the second set of data belonging to the second data owner at the next sequential node following the last node according to a node numbering schema; and
   distributing at least one different data element from the first set of data belonging to the first data owner at the next sequential node following the last node according to the node numbering schema.

2. The computing system of claim 1, wherein the first set of data belonging to the first data owner comprises at least one of the following: (i) metric-based data comprising one or more fact tables; and (ii) attribute-based data comprising one or more dimensional tables.

3. The computing system of claim 1, wherein the second set of data belonging to the second data owner comprises at least one of the following: (i) metric-based data comprising one or more fact tables; and (ii) attribute-based data comprising one or more dimensional tables.

4. The computing system of claim 1, wherein the processing device is configured to execute the executable instructions in order to effectuate the method further comprising:
   redistributing the at least one data element from the first set of data belonging to the first data owner among the at least two system nodes.

5. The computing system of claim 1, wherein the processing device is configured to execute the executable instructions in order to effectuate the method further comprising:
   redistributing the at least one data element from the second set of data belonging to the second data owner among the at least two system nodes.

6. A computer-implemented method comprising:
   obtaining, by a processing device, a first set of data belonging to a first data owner, wherein the first set of data comprises a plurality of data elements;
   obtaining, by the processing device, a second set of data belonging to a second data owner, wherein the second set of data comprises at least one data element, and wherein the second data owner is different than the first data owner;
   distributing, by the processing device, at least a portion of the first set of data and at least a portion of the second set of data sequentially among at least two system nodes, in data elements of substantially uniform size, wherein distributing the data sequentially comprises:
   distributing, by the processing device, at least one data element from the first set of data belonging to the first data owner sequentially from a first node to a last node;
   distributing, by the processing device, the at least one data element from the second set of data belonging to the second data owner at the next sequential node following the last node according to a node numbering schema; and
   distributing, by the processing device, at least one different data element from the first set of data belonging to the first data owner at the next sequential node following the last node according to the node numbering schema.

7. The computer-implemented method of claim 6, wherein the first set of data belonging to the first data owner comprises at least one of the following: (i) metric-based data comprising one or more fact tables; and (ii) attribute-based data comprising one or more dimensional tables.

8. The computer-implemented method of claim 6, wherein the second set of data belonging to the second data owner comprises at least one of the following: (i) metric-based data comprising one or more fact tables; and (ii) attribute-based data comprising one or more dimensional tables.

9. The computer-implemented method of claim 6, further comprising:
   redistributing, by the processing device, the at least one data element from the first set of data belonging to the first data owner among the at least two system nodes.

10. The computer-implemented method of claim 6, further comprising:
    redistributing, by the processing device, the at least one data element from the second set of data belonging to the second data owner among the at least two system nodes.

11. A non-transitory computer-readable medium comprising executable instructions that when executed by a processing device cause the processing device to effectuate a method comprising:
    obtaining a first set of data belonging to a first data owner, wherein the first set of data comprises a plurality of data elements;
    obtaining a second set of data belonging to a second data owner, wherein the second set of data comprises at least one data element, and wherein the second data owner is different than the first data owner;
    distributing at least a portion of the first set of data and at least a portion of the second set of data sequentially among at least two system nodes, in data elements of substantially uniform size, wherein distributing the data sequentially comprises:
    distributing at least one data element from the first set of data belonging to the first data owner sequentially from a first node to a last node;
    distributing the at least one data element from the second set of data belonging to the second data owner at the next sequential node following the last node according to a node numbering schema; and distributing at least one different data element from the first set of data belonging to the first data owner at the next sequential node following the last node according to the node numbering schema.

12. The non-transitory computer-readable medium of claim 11, wherein the first set of data belonging to the first data owner comprises at least one of the following: (i) metric-based data comprising one or more fact tables; and (ii) attribute-based data comprising one or more dimensional tables.

13. The non-transitory computer-readable medium of claim 11, wherein the second set of data belonging to the second data owner comprises at least one of the following: (i) metric-based data comprising one or more fact tables; and (ii) attribute-based data comprising one or more dimensional tables.

14. The non-transitory computer-readable medium of claim 11, wherein the executable instructions, when executed by the processing device, cause the processing device to effectuate the method further comprising:
redistributing the at least one data element from the first set of data belonging to the first data owner among the at least two system nodes.

15. The non-transitory computer-readable medium of claim 11, wherein the executable instructions, when executed by the processing device, cause the processing device to effectuate the method further comprising:
redistributing the at least one data element from the second set of data belonging to the second data owner among the at least two system nodes.

* * * * *